United States Patent [19]

Kim

[11] Patent Number: 4,572,824
[45] Date of Patent: Feb. 25, 1986

[54] PROCESS FOR RECOVERY OF ZIRCONIUM AND ACID FROM SPENT ETCHING SOLUTIONS

[75] Inventor: Bang M. Kim, Schenectady, N.Y.

[73] Assignee: General Electric Company, Schenectady, N.Y.

[21] Appl. No.: 667,027

[22] Filed: Nov. 1, 1984

[51] Int. Cl.[4] ............................................. C01G 25/00
[52] U.S. Cl. ....................................... 423/70; 156/642; 423/390
[58] Field of Search ....................... 423/69, 70; 156/642

[56] References Cited

U.S. PATENT DOCUMENTS

| | | | |
|---|---|---|---|
| 3,788,915 | 1/1974 | Gulla | 156/642 |
| 3,956,112 | 5/1976 | Lee et al. | 210/22 |
| 3,957,504 | 5/1976 | Ho et al. | 75/101 |
| 4,200,612 | 4/1980 | Lamaze | 423/70 |
| 4,233,108 | 11/1980 | Tamura et al. | 156/642 |
| 4,252,602 | 2/1981 | Krepler | 159/45 |
| 4,443,414 | 4/1984 | Kim | 423/54 |

OTHER PUBLICATIONS

Kim, B. M., "Method and Apparatus for Continuous Ion Exchange", U.S. patent application Ser. No. 407,963 filed Aug. 13, 1982.

Primary Examiner—H. T. Carter
Attorney, Agent, or Firm—Lawrence D. Cutter; James C. Davis, Jr.; Marvin Snyder

[57] ABSTRACT

In the manufacture of nuclear fuel tubes spent etching solutions containing nitric acid, zirconium, and hydrofluoric acid are produced as waste. A serial treatment process is employed to recover the zirconium and to restore the solution to the desired acid concentration. These processes include solvent extraction for zirconium removal and aqueous removal using evaporation or distillation.

8 Claims, 4 Drawing Figures

EVAPORATION OF HNO₃

DISTILLATION OF HNO₃

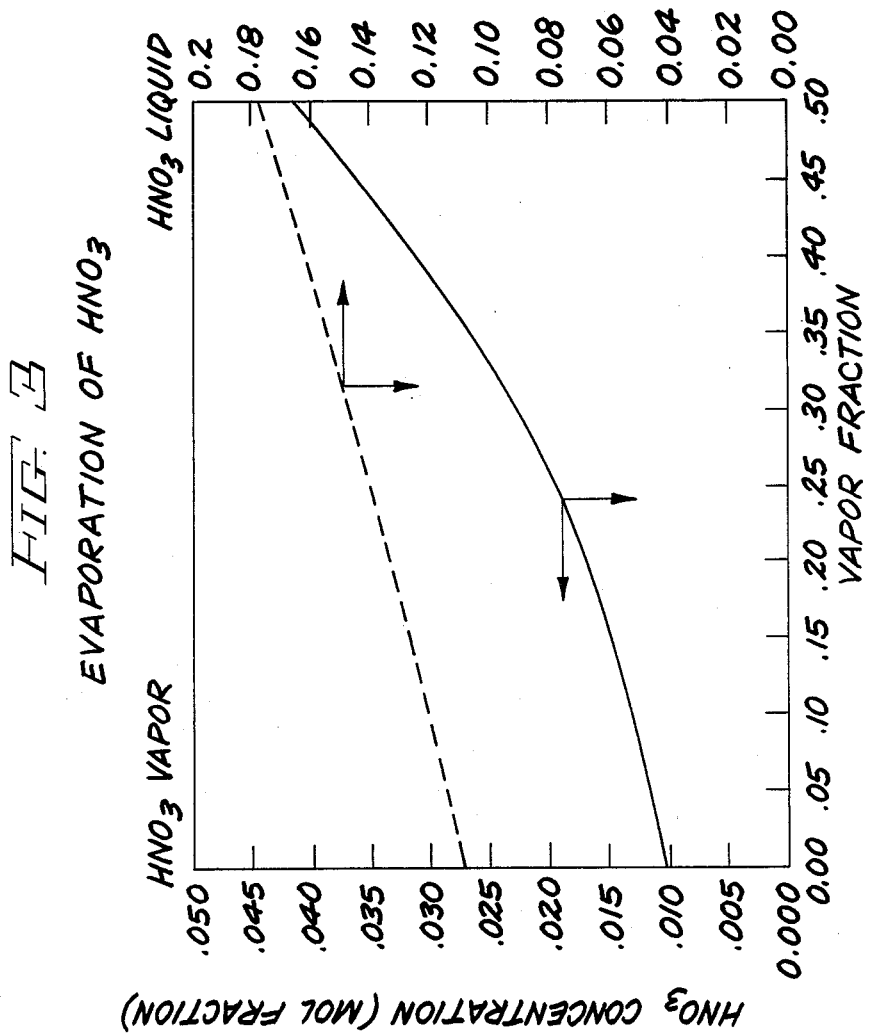

PROCESS FOR RECOVERY OF ZIRCONIUM AND ACID FROM SPENT ETCHING SOLUTIONS

BACKGROUND OF THE INVENTION

The present invention relates to the treatment of spent aqueous etchant solutions containing zirconium, nitric acid and hydrofluoric acid, from zirconium tube manufacturing processes. More particularly, the present invention relates to a series of treatment steps performed upon the etchant solution to recover zirconium and to restore the nitric acid to a concentration suitable for reuse in the etching process.

In the process for manufacturing nuclear fuel tubes, a nitric acid etching solution is employed. After processing this solution is found to contain approximately 25–30% nitric acid, 2–3% zirconium, 1–1.5% hydrofluoric acid and small amounts of other metals such as tin, iron, chrominum and nickel. For example, in a typical manufacturing process, as much as 3,000 gallons per week of spent etching solution might be produced. In some plants, the spent etching solution is treated as a waste by-product. However, if treated, it would be possible to recover significant amounts of zirconium and nitric acid for recycling of the acid to the fuel tube etching process.

Commercial processes for treating such a waste product involve evaporation and crystallization of the solution. Such evaporation processes have the following disadvantages. Firstly, high equipment costs are present due to the requirements for using chemically stable and heat resistant materials. Secondly, the process is not selective to zirconium and thus, further purification is required for reuse of zirconium. Thirdly, since a large volume of water should be evaporated, high energy costs are incurred. Fourthly, the process involves the loss of nitric acid since single stage evaporation produces vapor containing a significant amount of nitric acid. Fifthly, scale formation in the heat exchanger results in high maintenance cost.

SUMMARY OF THE INVENTION

In accordance with a preferred embodiment of the present invention a method for treating spent aqueous etchant solutions containing zirconium, residual metals, nitric acid and hydrofluoric acid from zirconium tube manufacturing processes comprises a two-step process in which zirconium is first selectively removed from the etchant solution using an organic solvent which selectively removes zirconium after which water is removed from the zirconium depleted etchant. The removal of zirconium can be performed in a batch mode or a continuous mode using mixing tanks, pulsating columns or membrane extractors. Water removal may be accomplished by evaporation. In short, a process for treating the spent etchant solution in accordance with the present invention comprises recovery of zirconium from the waste solution, and final concentration of the etching solution for recycling to the tube manufacturing process.

Accordingly, it is an object of the present invention to provide a process for treatment and recycling of spent etchant solutions from zirconium tube manufacturing processes.

It is also an object of the present invention to provide a process for recovery of zirconium metal.

It is yet another object of the present invention to provide treatment of waste etchant solutions so as to enable the treated solution to be returned to the manufacturing process.

Lastly, but not limited hereto, it is an object of the present invention to reduce the cost and waste products from zirconium tube manufacturing processes.

DESCRIPTION OF THE FIGURE

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

FIG. 3 illustrates nitric acid concentration (mol fraction) in the vapor phase at various vapor fractions.

DETAILED DESCRIPTION OF THE INVENTION

Figure 1:
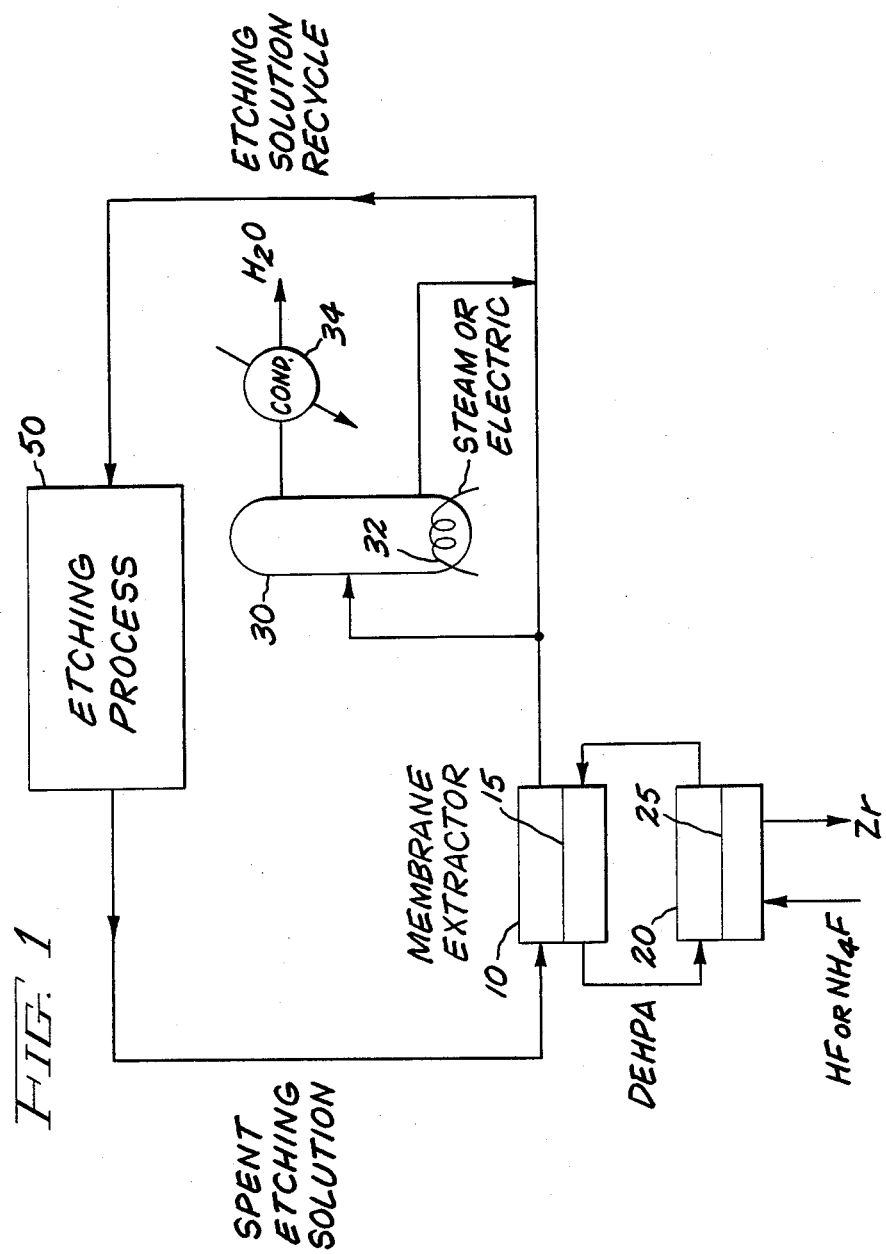
FIG. 1 is a schematic flow diagram illustrating one embodiment of the method of the present invention.

The process of the present invention is illustrated schematically in FIG. 1. A membrane extractor is shown in this Figure although a mixing tank or pulsating columns can be employed for solvent extraction. In the mixing tank method an extraction solvent is added to the zirconium containing solution to be treated. It is then mixed and allowed to settle. The aqueous portion is then drained off. A stripping agent is then added and the resulting concentrated solution is again mixed and allowed to settle. The organic phase is left and the aqueous phase contains the desired high zirconium concentration which may be further enhanced by evaporation or distillation. The organic phase may be reused. It is chemically similar to a membrane process without the use of membranes, but with the processes occurring in a similar fashion.

In the method shown, etchant solution form etching process 50 is supplied to the dual membrane solvent extractor comprising vessels 10 and 20, each of which is divided into distinct volumes by membranes 15 and 25, respectively. The spent etching solution from process 50 contains zirconium, nitric acid and, typically, residual metals in solution. The membrane extraction process is used for recovery of the zirconium, as illustrated. Unlike conventional solvent extraction processes in which organic solvents are directly contacted with aqueous solutions by vigorous mixing, membrane processes employed in the present invention use a solvent which is in contact with an aqueous solution only at the interface created in the pores of the membrane. For zirconium, the preferable solvent is di-2-ethyl hexylphosphoric acid (DEHPA). The zirconium extraction process preferably employs two membrane contactors 15 and 25 as shown, one of which, 15, is for extraction and the other of which, 25, is for stripping. Thus zirconium ions are removed from the organic solution in the stripping module and the regenerated solvent is recycled to the extraction module, as shown. The preferable stripping agents for zirconium extraction are HF and $NH_4F$ at a concentration from about 0.5 to 3 molar/liter.

The membrane extraction process has several advantages over conventional solvent extraction. These advantages include simplicity, reduced solvent loss, multistage performance in a single stage operation and increased flexibility in the choice of organic solvents which may be employed. Similar extraction processes are described for example in U.S. Pat. No. 4,443,414 issued Apr. 17, 1984 to Bang Mo Kim, the inventor herein. The patent describes a process for separation of molybdenum from tungsten leachates employing tributyl phosphate (TBP) as a solvent in a dual membrane extraction process. As indicated above, DEHPA is employed as an effective extractant for zirconium in the presence of concentrated nitric acid, $HNO_3$, and hydrofluroric acid, HF. The membrane extraction system selectively removes zirconium which is the most important metal to be removed. DEHPA, loaded with zirconium, is stripped with concentrated ammonium fluoride or hydrofluoric acid.

The treated etching solution from membrane extractor vessel 10 and/or process step 30 is then subjected to an aqueous removal operation. Aqueous removal may be accomplished by evaporation or distillation. Aqueous removal is practiced at this stage of the process, and it is not being used for metal extraction but only for concentrating the nitric acid in the etching solution. For example, it is typically only necessary to increase the nitric acid concentration from 30% to 33%, by weight. Since only a relatively small amount of water need be removed to accomplish this objective, processes such as evaporation and distillation may be employed for a portion of the etching solution. The removal of zirconium together with aqueous removal to concentrate the nitric acid solution therefore renders it possible to return the etching solution to etching process 50. Accordingly, all of these operations are shown in the schematic flow diagram of FIG. 1. A portion of treated etching solution, that is, with reduced Zr content, is processed to produce a stream having reduced aqueous content, either by evaporation or distillation. For example, treated solution from the membrane extraction unit may be provided to vessel 30 in which steam or electric heater 32 is employed to partially vaporize the solution. The vaporized solution having lower $HNO_3$ may be treated in condenser 34 to produce a liquid phase low in $HNO_3$ concentration.

After operating the system for a prolonged period of time, residual metals such as Sn, Ni, Cr and Fe tend to accumulate into the etching solution. If concentrations of these metals exceed the tolerance level, the old etching solution should be replaced with new etching solution.

Solvent extraction tests have been performed to evaluate the effectiveness of several solvents for removal of zirconium from an etching solution. The results of these tests are shown in Table 1. Tributyl phosphate, Alamine ®, and Aliquat ® were not found to be effective for removal of zirconium.

TABLE 1

| EVALUATION OF SOLVENTS | | |
|---|---|---|
| | Zr Conc. | |
| SOLVENTS | Before (g/l) | After (g/l) |
| 100% TBP (Tributyl Phosphate) | 30.5 | 33.5 |
| 5% Alamine ® in Kerosene | 30.5 | 30.2 |

TABLE 1-continued

| EVALUATION OF SOLVENTS | | |
|---|---|---|
| | Zr Conc. | |
| SOLVENTS | Before (g/l) | After (g/l) |
| 5% Aliquat ® in Kerosene | 30.5 | 29.2 |
| 50% Alamine ® in Kerosene | 30.5 | 32.2 |
| 50% Aliquat ® in Kerosene | 30.5 | 35.9 |

The results of extraction and stripping experiments with DEHPA are shown in Table 2. DEHPA was effective for removal of zirconium with increased percentage removal at increased organic/aqueous (O/A) volume ratios. The stripping experiment was performed with various chemicals. Only ammonium Fluoride ($HN_4F$) and hydrofluoric acid stripped zirconium satisfactorily.

The reextraction of originl etchant solution using DEHPA stripped with $NH_4F$ removal zirconium quite satisfactorily. See Table 3.

TABLE 2

| EQUILIBRIUM MEASUREMENTS OF DEHPA | | | |
|---|---|---|---|
| EXTRACTION[1] | | | |
| | Zr Conc. | | |
| Organic/Aqueous Ratio | Before (g/l) | After (g/l) | % Removal |
| 1.0 | 29.4 | 18.1 | 38.4 |
| 2.0 | 29.4 | 15.9 | 46 |
| 3.0 | 29.4 | 13.5 | 54 |
| 4.0 | 29.4 | 9.0 | 69 |

| STRIPPING[2] | | | |
|---|---|---|---|
| SOLUTION | ORGANIC/AQUEOUS | Zr CONC. (g/l) | % REMOVAL |
| 2M $NH_4F$ | 1 | 9.0 | 75.0 |
| 2M $NH_4F$ | 2 | 19.6 | 82.0 |
| 2M $NH_4F$ | 4 | 28 | 58.0 |
| 2M HF | 1 | 9.2 | 77.0 |
| 2M NaF | 1 | 0.3 | 2.5 |

[1]Extraction of Raw Solution
[2]Stripping DEHPA Containing 12 g/l of Zr

TABLE 3

| REEXTRACTION USING DEHPA STRIPPED WITH $NH_4F$ | | | |
|---|---|---|---|
| | Zr CONC. | | |
| Organic/Aqueous Ratio | Before (g/l) | After (g/l) | % Removal |
| 1 | 28.2 | 19.6 | 31 |
| 2 | 28.2 | 15.8 | 44 |

The zirconium removal rate was measured using hollow fiber membrane extractor for different pore sizes and different concentrations of DEHPA. The results are presented in Table 4. The highest flux was obtained with $0.05\mu$ pore size and 30% DEHPA in a one-to-one mixture of kerosene and an aromatic hydrocarbon.

TABLE 4

| COMPARISON OF FLUXES | | |
|---|---|---|
| HOLLOW FIBER | SOLVENTS | FLUX |
| Polypropylene 0.03 μpore | 100% DEHPA | 0.48 g/hr-ft$^2$ |
| Polypropylene 0.03 μpore | 30% DEHPA[1] | 0.69 g/hr-ft$^2$ |
| Polypropylene 0.05 μpore | 30% DEHPA[1] | 0.95 g/hr-ft$^2$ |

[1]Diluent: Equal Mixture of Kerosene and Aromatic 150

Figure 2:
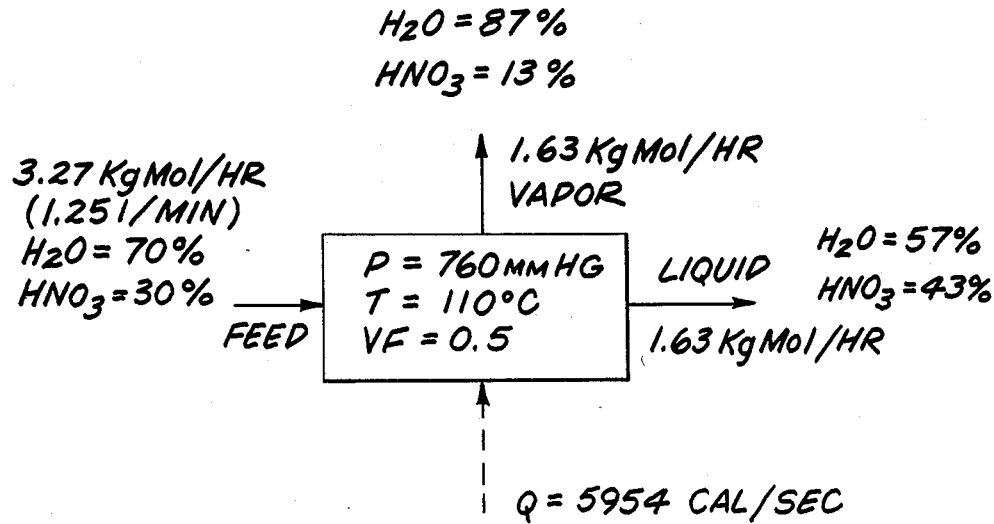
FIG. 2 illustrates a heat and mass flow balance simulation for evaporation of water from aqueous nitric acid solutions.

A computer simulation of evaporation of spent-etching solution was performed. FIG. 2 shows the results of simulation of evaporation of $HNO_3$ at 1 atomsphere and the vapor fraction after evaporation being 0.5. The increase in $HNO_3$ concentration from 30% to 43% can be seen.

FIG. 3 shows the $HNO_3$ concentration (mol fraction) in the vapor phase and liquid phase as a fraction of vapor fraction.

Figure 4:
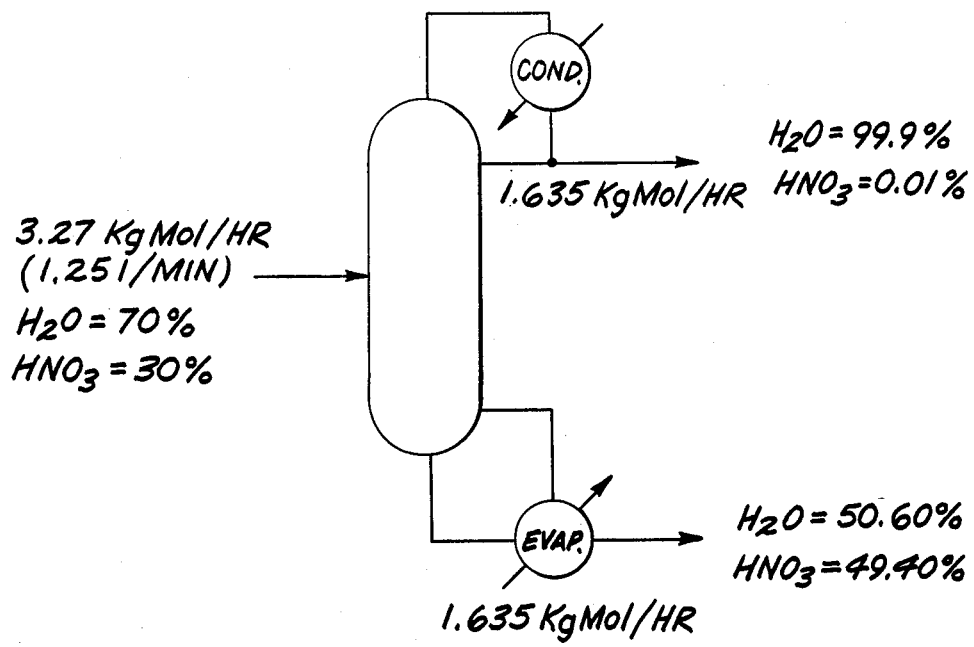
FIG. 4 illustrates a mass balance simulation for an etching solution supplied to a distillation column with five stages.

FIG. 4 shows the mass balance of materials when the etching solution is fed to a distillation column with five theoretical stages with a reflux ratio of 2.5. Distillation of 30% $HNO_3$ solution results in 49.4% $NHO_3$ in this liquid and 99.9% $H_2O$ in the vapor phase.

The process described here is for treatment of zirconium etching solution, but the same methods can be applied to treatment of other etching solutions, due regard being given to appropriate extractants.

From the above, it is therefore seen that it is possible to provide a treatment for etchant solutions used in zirconium tube manufacture, such tubes being useful for containment of nuclear fuels. It is further seen that the process of the present invention not only recovers valuable zirconium but also enables the etchant solution to be restored to acid concentrations sufficient to recycle it to the etching process. Additionally, residual metal removal may also be employed in the present invention if the concentrations of residual metals are high enough to warrant their recovery.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A method for treating spent aqueous etchant containing zirconium, nitric acid, and hydrofluoric acid from a zirconium tube etching bath, said method comprising:

contacting said zirconium bearing etchant solution with a first side of a first membrane disposed in a first chamber to produce zirconium depleted etchant;

contacting the second side of said first membrane with a zirconium selective solvent;

circulating said solvent which has been in contact with said second side of said first membrane in said first chamber so as to contact a first side of a second membrane disposed in a second chamber;

recirculating the solvent which has been in contact with the first side of said second membrane so as to recontact the second side of said first membrane contacting the second side of said second membrane with a stripping solution; and removing water from said zirconium depleted etchant whereby the concentration of said acids is increased 2. The method of claim 1 in which said solvent comprises DEHPA.

3. The method of claim 1 in which said solvent comprises a solution comprising DEHPA and material selected from the group consisting of kerosene and aromatic hydrocarbons.

4. The method of claim 1 in which said membrane based extractor process employs a stripping agent selected from the group consisting of hydrofluoric acid and ammonium fluoride.

5. The method of claim 4 in which the concentration of said stripping agent in an aqueous solution is between about 0.5 and 3 mole/liter.

6. The method of claim 1 in which said water removal is performed by evaporation.

7. The method of claim 1 in which said water removal is performed by distillation.

8. The method of claim 1 further including the step of returning said solution with concentrated nitric acid to said etching bath.

* * * * *